United States Patent
Graves et al.

(10) Patent No.: US 8,387,566 B2
(45) Date of Patent: Mar. 5, 2013

(54) GRAVITY-INDUCED AUTOMATIC ANIMAL WATERING/FEEDING DEVICE

(75) Inventors: Jason R. Graves, Knoxville, TN (US); Marc E. Brush, Knoxville, TN (US); Ben T. Ferguson, III, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 671 days.

(21) Appl. No.: 12/547,014

(22) Filed: Aug. 25, 2009

(65) Prior Publication Data

US 2010/0050950 A1 Mar. 4, 2010

Related U.S. Application Data

(60) Provisional application No. 61/091,923, filed on Aug. 26, 2008.

(51) Int. Cl.
*A01K 7/00* (2006.01)

(52) U.S. Cl. ........ 119/72; 119/74; 119/51.01; 119/51.5; 119/77

(58) Field of Classification Search ............ 119/72, 119/74, 75, 51.5, 475, 77, 51.01, 454, 52.1, 119/80; D30/121, 132, 133; 137/588, 541, 137/549; 239/347, 350, 379

See application file for complete search history.

(56) References Cited

U.S. PATENT DOCUMENTS

| | | | |
|---|---|---|---|
| 586,878 A * | 7/1897 | Stewart | 222/587 |
| 1,820,835 A * | 8/1931 | Sauvageau | 119/77 |
| 1,977,571 A * | 10/1934 | Brumm | 137/454 |
| 4,134,365 A * | 1/1979 | Futers et al. | 119/51.5 |
| 4,778,595 A | 10/1988 | Sable et al. | |
| 4,840,143 A * | 6/1989 | Simon | 119/52.1 |
| 5,486,285 A * | 1/1996 | Feeney | 210/85 |
| 5,609,759 A | 3/1997 | Nohren, Jr. et al. | |
| 5,635,079 A * | 6/1997 | Becking, II | 210/767 |
| 5,842,437 A | 12/1998 | Burns | |
| 6,079,361 A * | 6/2000 | Bowell et al. | 119/72 |
| 6,165,362 A | 12/2000 | Nohren, Jr. et al. | |
| 6,290,848 B1 | 9/2001 | Tanner et al. | |
| D457,692 S * | 5/2002 | Skurdalsvold et al. | D30/132 |
| 6,467,428 B1 | 10/2002 | Andrisin et al. | |
| 6,622,657 B2 | 9/2003 | Northrop et al. | |
| D503,247 S * | 3/2005 | Ross | D30/132 |
| 6,928,954 B2 | 8/2005 | Krishnamurthy | |
| 7,082,971 B2 | 8/2006 | Gauthier | |
| 7,089,881 B2 | 8/2006 | Plante | |
| 7,204,202 B2 | 4/2007 | Behun et al. | |
| 7,270,082 B2 | 9/2007 | Plante | |
| 7,757,636 B2 * | 7/2010 | McCallum et al. | 119/74 |
| 2007/0102332 A1 * | 5/2007 | Bommi et al. | 210/136 |
| 2007/0251955 A1 * | 11/2007 | Green | 222/185.1 |
| 2008/0257272 A1 * | 10/2008 | Bolda | 119/72 |

* cited by examiner

*Primary Examiner* — Andrea Valenti
(74) *Attorney, Agent, or Firm* — Pitts & Lake, PC

(57) ABSTRACT

Described is a gravity-induced automatic animal watering/feeding device that promotes increased sanitation and minimizes the amount of water/food spilled from the device in the event the device is overturned. More specifically, the animal watering/feeding device presents consumables, including water and animal food, to the animal using a receptacle that is removable from the remainder of the device. Because the receptacle is removable, it is easily replaced and/or removed for cleaning such that sanitation of the animal watering/feeding device is easily maintained. Additionally, selected components of the animal water/feeding device are releasably locked to one another such that the device minimizes the amount of water/food that is spilled from the device in the event it is overturned.

13 Claims, 11 Drawing Sheets

GRAVITY-INDUCED AUTOMATIC ANIMAL WATERING/FEEDING DEVICE

CROSS-REFERENCE TO RELATED APPLICATIONS

This application claims the benefit of U.S. Provisional Patent Application No. 61/091,923, filed Aug. 26, 2008.

STATEMENT REGARDING FEDERALLY SPONSORED RESEARCH OR DEVELOPMENT

Not Applicable

BACKGROUND OF THE INVENTION

1. Field of the Invention

This invention pertains to a device for automatically providing water/food to an animal utilizing the force of gravity.

2. Description of the Related Art

Many animal owners have a need or a desire to water and/or feed their animals without having to do so manually. The need arises when the owner is absent and unable to manually water and feed an animal at the appropriate time because, for example, the owner's schedule does not permit such. The desire arises as a matter of convenience. Many conventional pet feeders and watering devices automatically deliver food and/or water to an animal, and many of these automatic pet feeders and watering devices accomplish this utilizing the force of gravity. For example, see U.S. Pat. No. 6,467,428. These conventional devices typically include a vessel and a bowl. The vessel stores water or food above the bowl and includes an opening. The bowl receives and supports the vessel such that the stored water or food passes through the opening, under the force of gravity, and into the bowl. The bowl presents the food or water such that it is accessible by an animal. As the animal consumes the food or water from the bowl, gravity forces more food or water through the opening and into the bowl. As food, water, and saliva from the animal occupy the bowl, certain bacteria develop in the bowl such that regular cleaning of the bowl is required to maintain a proper level of sanitation for the animal.

These conventional devices are limited in that they are prone to becoming insanitary and to spilling the stored water or food. More specifically, the bowl of these conventional devices must be substantial to the extent that it structurally supports the vessel when the vessel stores food or water. As a result, proper cleaning of the bowl is cumbersome and is typically neglected by a user. More specifically, to clean the bowl, the user must first remove the vessel from the bowl and then clean the bowl, which is an awkward task due to the size and shape of the bowl. Accordingly, users typically do not clean the bowl with the regularity required for maintaining a sanitary bowl.

Additionally, the vessel and the bowl of a conventional device include respective components of a slot-and-projection configuration for engaging the vessel and the bowl, such an engagement being designed to secure the vessel to the bowl. However, in the event the conventional device is overturned by, for example, an animal or a user, the slot-projection configuration is not sufficient to maintain the engagement of the vessel and the bowl. As a result, when the device is overturned, the vessel disengages from the bowl, and the water or food stored within the vessel is spilled. Consequently, a device that promotes sanitation of the bowl portion of an automatic pet feeder and watering device and that reduces the spilling of the contents of the vessel in the event the device is overturned is desired.

BRIEF SUMMARY OF THE INVENTION

In accordance with the various features of the present invention there is provided a gravity-induced automatic animal watering/feeding device that promotes increased sanitation and minimizes the amount of water/food spilled from the device in the event the device is overturned. More specifically, the animal water/feeding device includes a reservoir, a base member, and a receptacle. The reservoir is adapted to house a consumable, such as water or animal food, and defines a reservoir opening. The reservoir engages the base member such that the reservoir is releasably locked to the base member. Additionally, the base member removably receives the receptacle. When the reservoir is engaged with the base member, the base member structurally supports the reservoir above the base member such that the water/food housed by the reservoir automatically passes from the reservoir, by way of the reservoir opening, and is received and collected by the receptacle such that the animal is able to access the water/food from the receptacle. Because the receptacle is removable from the base member, the receptacle is easily replaced and/or cleaned. Additionally, because the reservoir is locked to the base member, in the event the animal watering/feeding device is overturned, the base member and the reservoir remain engaged such that the water/food housed by the reservoir is not spilled from the device.

One embodiment of the animal watering/feeding device includes a water filter module. In this embodiment, the reservoir houses water and the water filter module is disposed within the reservoir. The water filter module includes a filter ventilation system that displaces water flowing from the reservoir with ambient air such that water housed by the reservoir passes through the water filter module, from the reservoir, and to the receptacle. The result is that the animal watering/feeding device provides the animal with filtered water.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1b illustrates a perspective view of the animal watering/feeding device of FIG. 1a;

FIG. 9b illustrates a perspective view of the animal watering/feeding device of FIG. 9a.

DETAILED DESCRIPTION OF THE INVENTION

The present invention provides a gravity-induced automatic animal watering/feeding device that promotes increased sanitation and minimizes the amount of water/food spilled from the device in the event the device is overturned. More specifically, the animal watering/feeding device presents consumables, including water and animal food, to the animal using a receptacle that is removable from the remainder of the device. Because the receptacle is removable, it is easily replaced and/or removed for cleaning such that sanitation of the animal watering/feeding device is easily maintained. Additionally, selected components of the animal water/feeding device are releasably locked to one another such that the device minimizes the amount of water/food that is spilled from the device in the event it is overturned. One embodiment of the animal watering/feeding device constructed in accordance with the various features of the present invention is illustrated generally at 10 in FIGS. 1a and 1b.

Figure 1A:
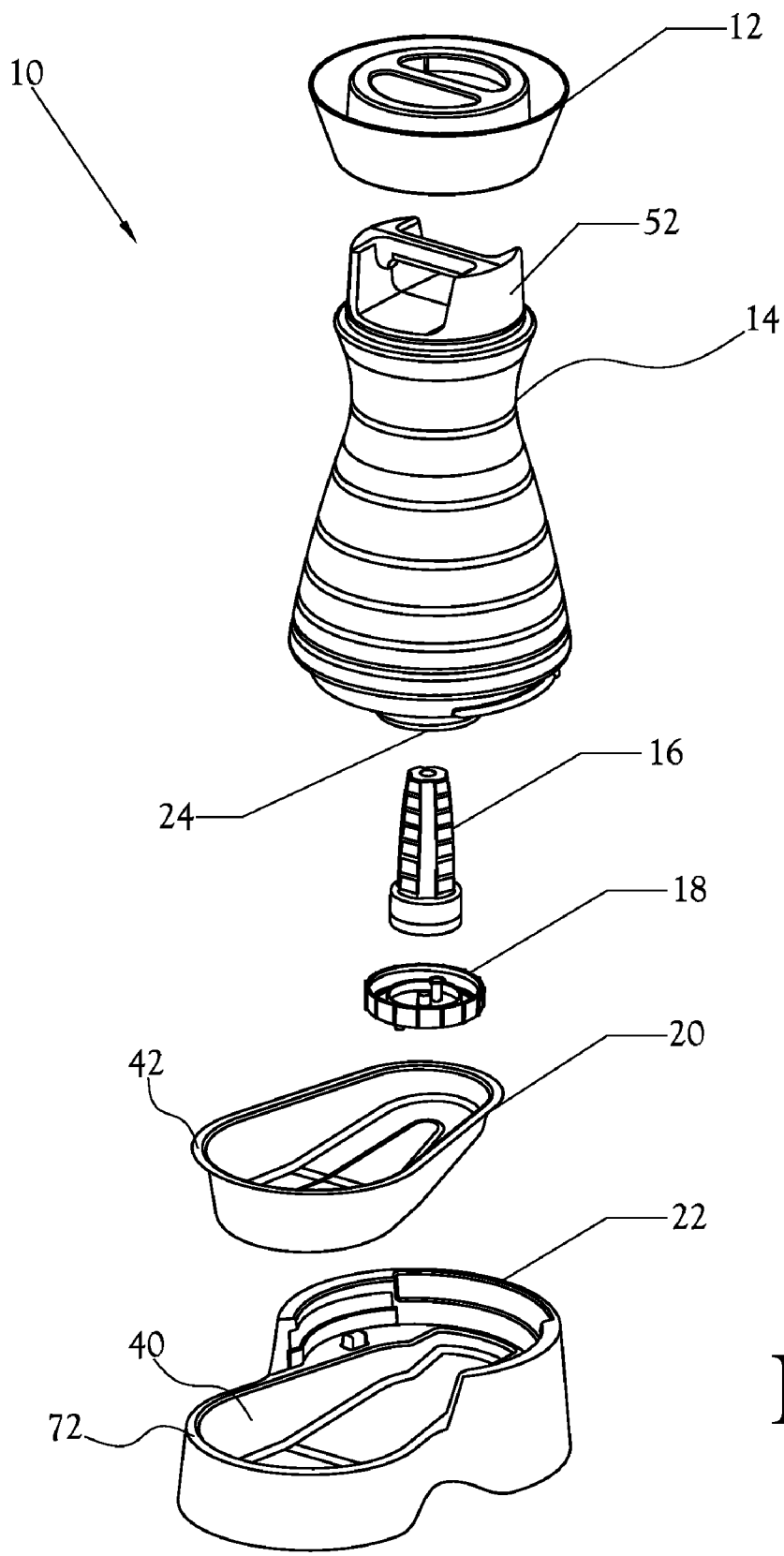
FIG. 1a illustrates an exploded view of one embodiment of the animal watering/feeding device in accordance with the various features of the present invention.
Figure 1B:
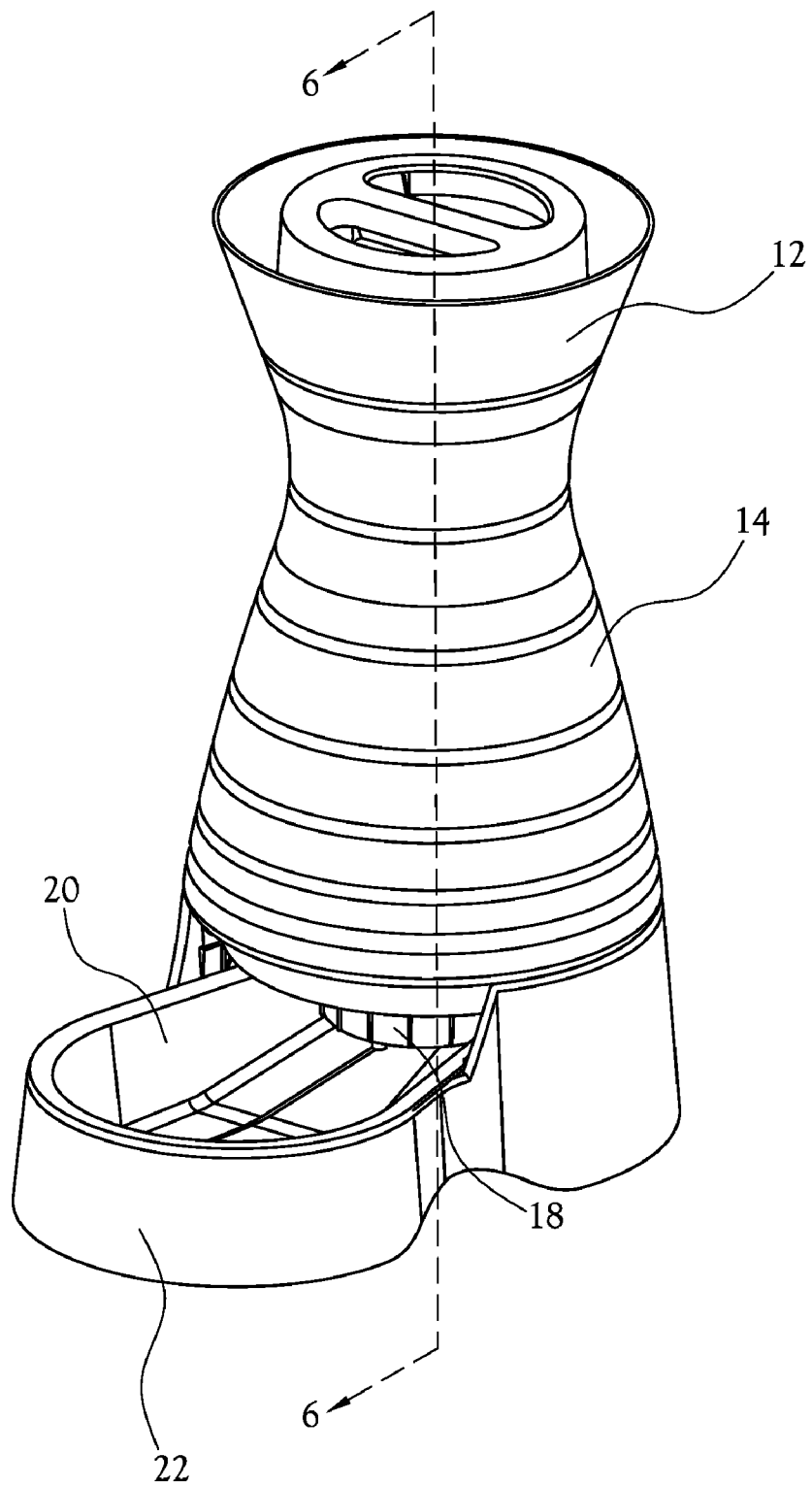

FIG. 1a is an exploded view of one embodiment of the animal watering/feeding device 10, and FIG. 1b illustrates a fully constructed view of the same embodiment. The animal watering/feeding device 10 includes a reservoir support member 12, a reservoir 14, a receptacle 20, and a base member 22. The animal watering/feeding device 10 automatically provides consumables such as water, animal food, animal treats, or any other consumable substance suitable for use with a gravity-induced animal feeder. In the illustrated embodiment of FIGS. 1a and 1b, the animal watering/feeding device 10 is adapted to provide the animal with water. Consequently, in the illustrated embodiment, the device 10 also includes a water filter module 16 and a reservoir cap 18. The reservoir 14 is an enclosed container that is adapted to house water or animal food and that defines a reservoir opening 24. In the illustrated embodiment, the reservoir 14 defines a reservoir handle 52, which facilitates the manual transport of the reservoir 14 by a user of the animal watering/feeding device 10. The reservoir cap 18 is secured to the reservoir 14 at the reservoir opening 24 such that the reservoir cap 18 and the reservoir 14 generate a water-tight seal at the opening 24. In the illustrated embodiment, the reservoir cap 18 is removably secured to the reservoir 14 by way of respective cooperating threaded portions defined by each of the reservoir cap 18 and the reservoir 14. However, it should be noted that the reservoir cap 18 can be secured to the reservoir 14 using configurations other than cooperating threaded portions, such as cooperating snap fasteners, without departing from the scope or spirit of the present invention.

Figure 2:
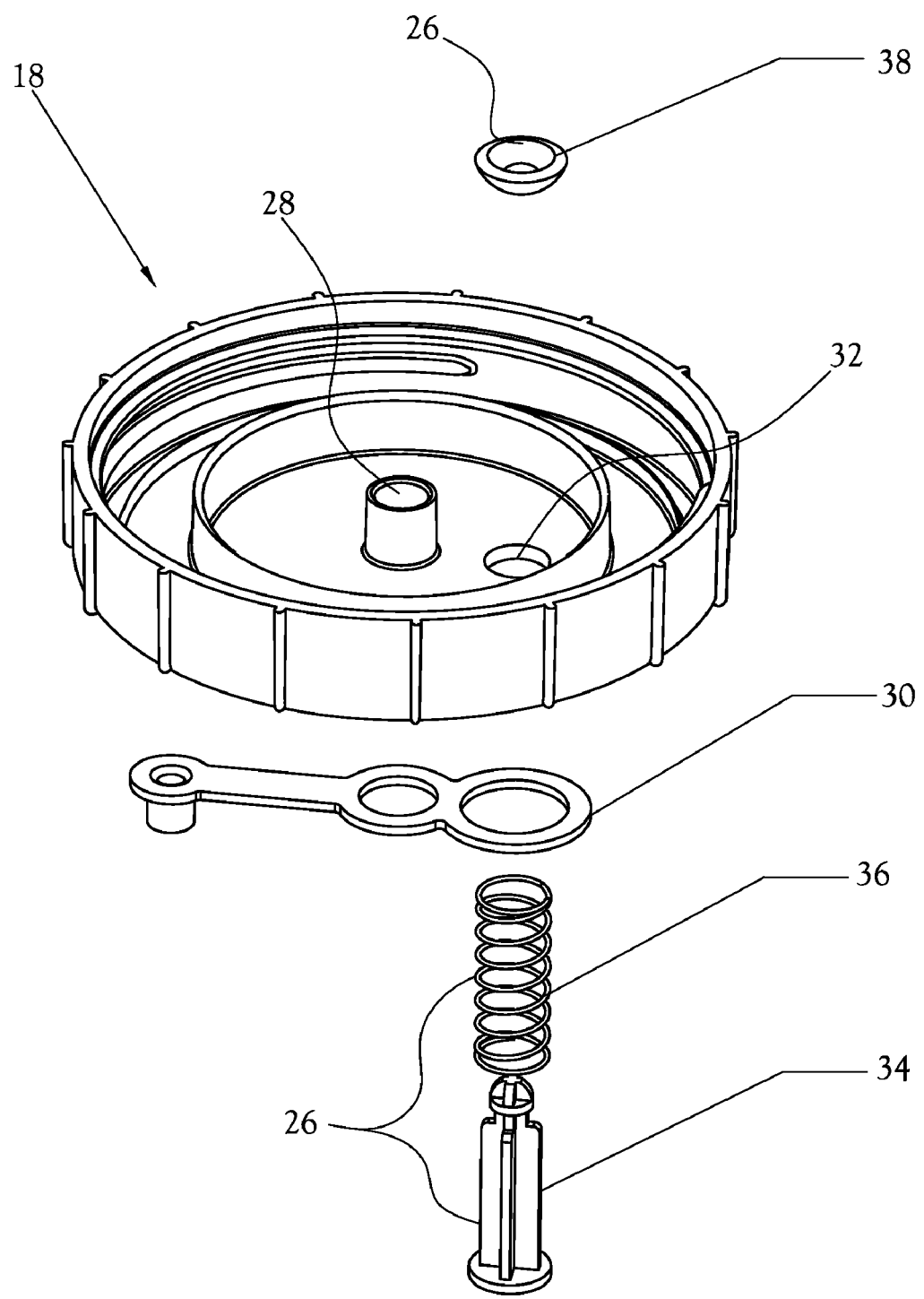
FIG. 2 illustrates an exploded view of one embodiment of the reservoir cap of the animal watering/feeding device.
Figure 3A:
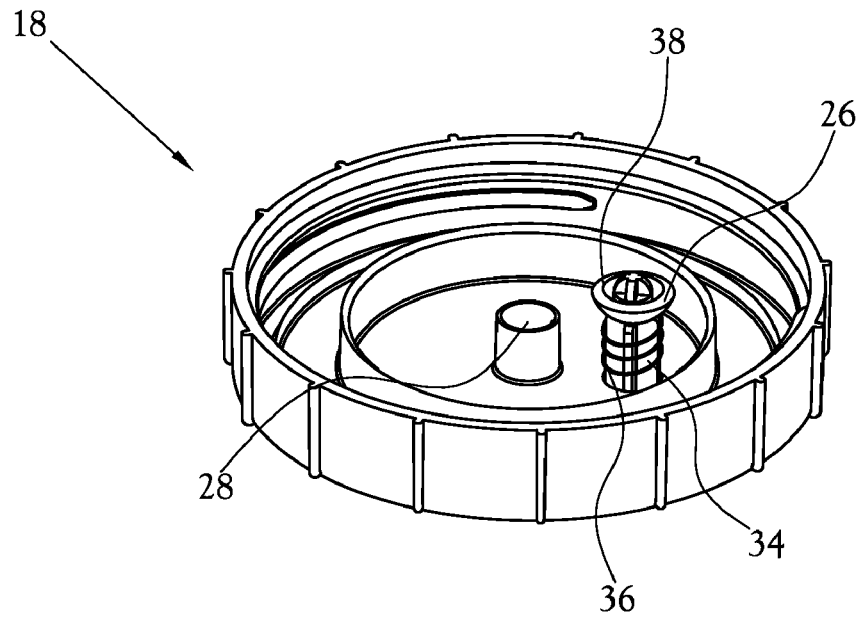
FIG. 3a illustrates an alternate view of the reservoir cap of FIG. 2.

FIG. 2 illustrates an exploded view of one embodiment of the reservoir cap 18 in accordance with the various features of the present invention. In the illustrated embodiment, the reservoir cap 18 defines a water outlet 32 and includes a water valve 26, an air inlet 28, and a plug 30. The water valve 26 is movable between an open position and a closed position and is disposed within the water outlet 32, as is further illustrated at FIGS. 3a and 3b. The water valve 26 is biased to the closed position. When at the closed position, the water valve 26 generates a water-tight seal at the water outlet 32 such that water does not pass through the water outlet 32. When forced to the open position, the water valve 26 permits water to flow through the water outlet 32 such that water can exit the reservoir 14 by way of the water outlet 32. In the illustrated embodiment, the water valve 26 includes a valve stem 34, a valve spring 36, and a valve seal 38. The valve seal 38 is secured to the valve stem 34 such that when the reservoir cap 18 is fastened to the reservoir 14, the valve seal 38 is disposed within the reservoir 14. The valve spring 36 mechanically engages and applies a biasing force against the valve stem 34 such that the valve stem 34 positions the valve seal 38 at the water outlet 32 to the extent that the valve seal 38 generates the water-tight seal at the water outlet 32. Accordingly, the water valve 26 generates the water-tight seal at the water outlet 32 unless a force against the valve stem 34 overcomes the biasing force. It should be noted that the water valve 26 can be a valve other than one including the valve stem 34, the valve spring 36, and the valve seal 38 without departing from the scope or spirit of the present invention.

Considering again FIG. 1a, the receptacle 20 is adapted to collect water from the reservoir 14 such that the water is accessible by the animal. In the illustrated embodiment, the receptacle 20 defines an open top container such that water collected by the receptacle 20 is accessible by the animal by way of the open top. The receptacle 20 is removably received by the base member 22. More specifically, in the illustrated embodiment, the base member 22 defines a recess 40 and a perimeter portion 72 at the mouth of the recess 40. Additionally, in the illustrated embodiment, the receptacle 20 defines a shoulder 42 at the perimeter of the open top, the shoulder 42 extending outward from the interior of the receptacle 20. The receptacle 20 is received by the recess 40 such that the shoulder 42 rests on the perimeter portion 72. The shoulder 42 covers the perimeter portion 72 of the base member 22 to the extent that the shoulder 42 prevents water from getting between the receptacle 20 and the base member 22. As a result, the recess 40 is not exposed to the water or the mouth of the animal and therefore does not require regular sanitation. Stated differently, the only component of the animal watering/feeding device 10 that requires regular sanitation is the receptacle 20. In one embodiment, the shoulder 42, in combination with the exterior of the receptacle 20, defines a "U" shape such that the shoulder 42 wraps around the perimeter portion 72 of the base member 22, providing an additional degree of coverage. In one embodiment, when the receptacle 20 is received by the base member 22, the receptacle 20 is removably secured to the base member 22. For example, the receptacle 20 can be secured to the base member 22 by way of snap fasteners, hooks, or clamps, or the receptacle 20 can be adapted to press-fit into the base member 22. It should also be noted that the receptacle 20 can be constructed of various materials such as a metal (e.g., stainless steel), a plastic, or a paper. It should also be noted that the receptacle 20 can be washable or disposable.

Figure 4:
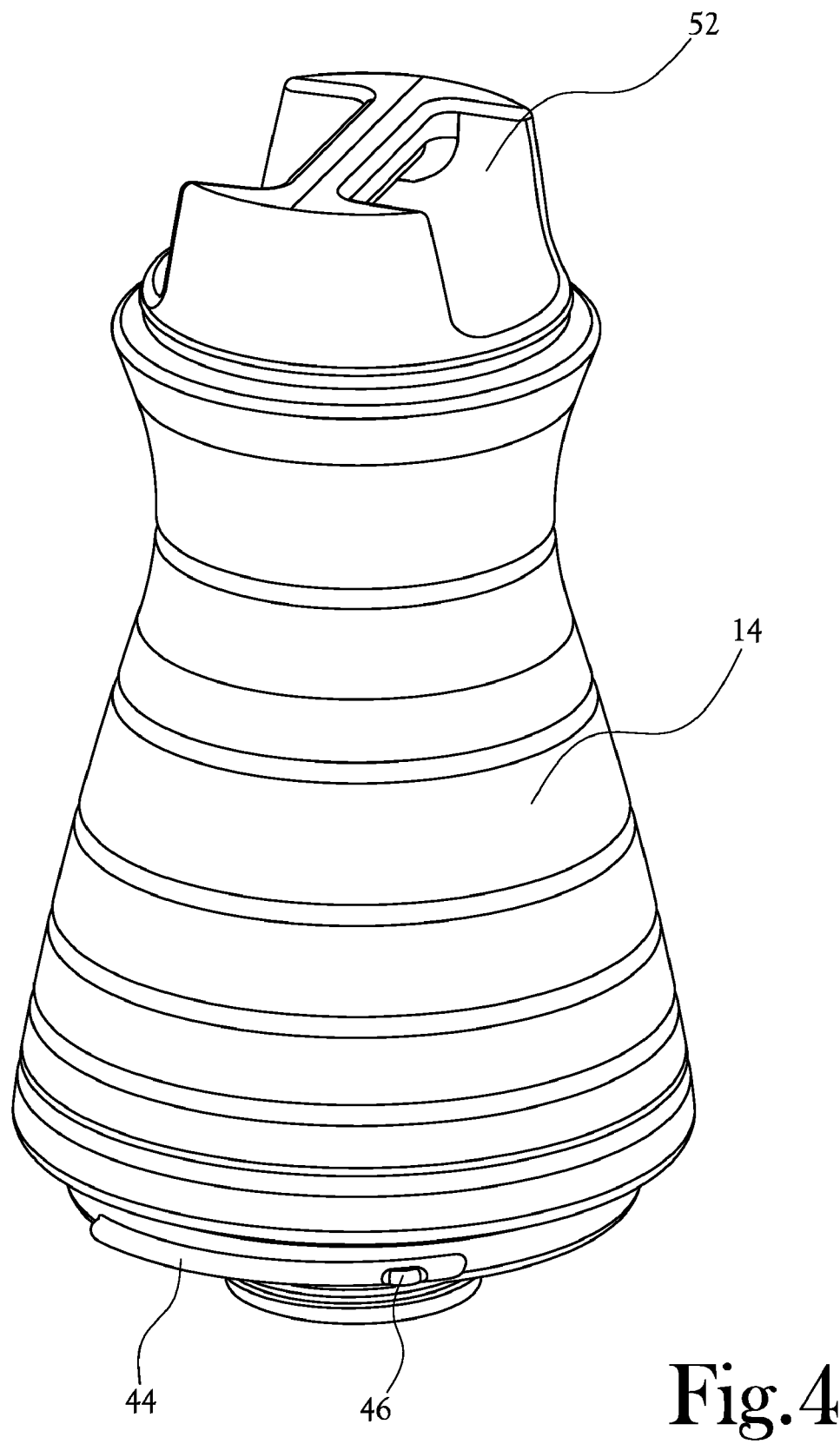
FIG. 4 illustrates the reservoir of the animal watering/feeding device of FIGS. 1a and 1b.
Figure 5:
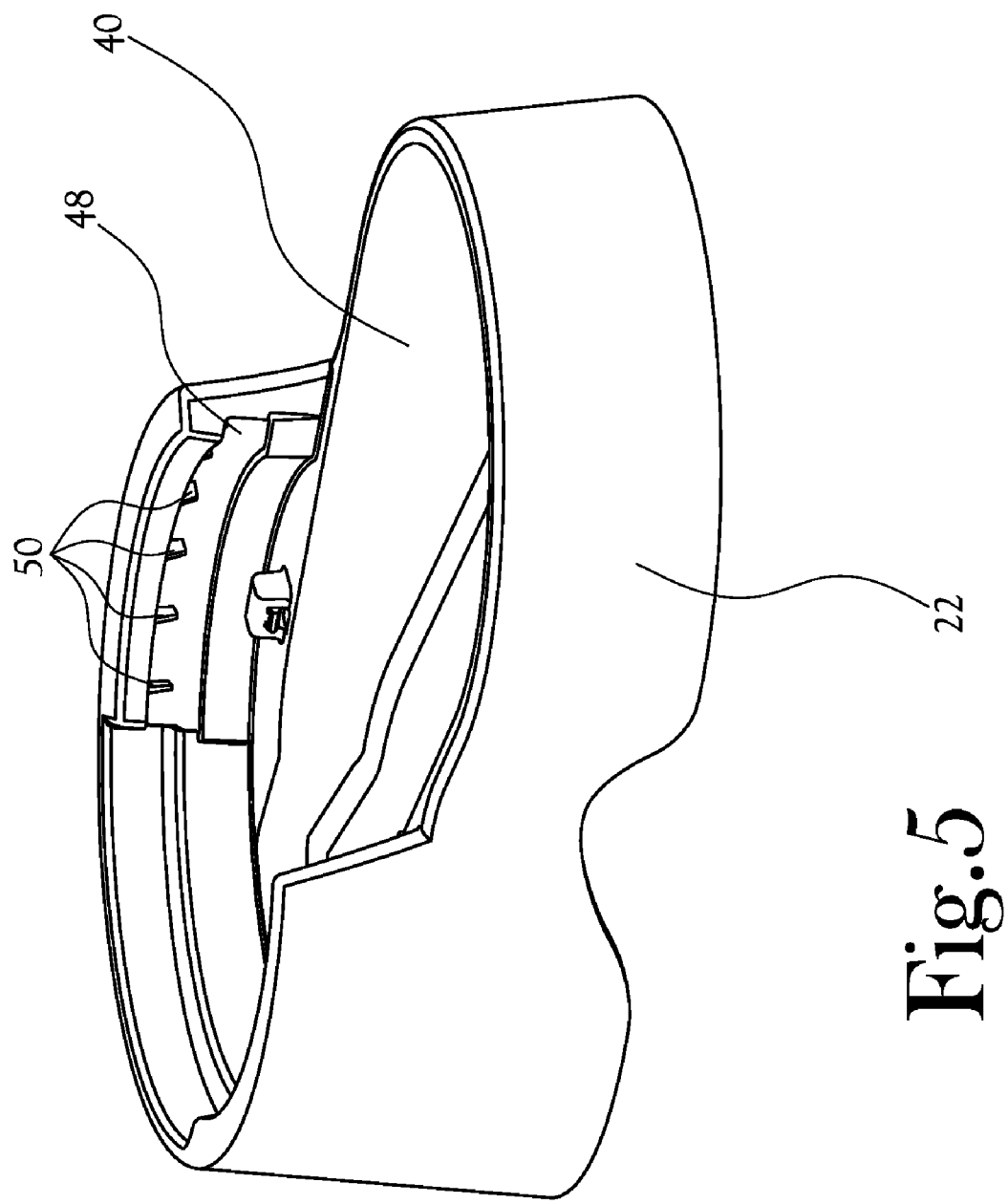
FIG. 5 illustrates the base member of the animal watering/feeding device of FIGS. 1a and 1b.

The base member 22 engages the reservoir 14 such that the base member 22 structurally supports the reservoir 14 and such that water flowing through the water outlet 32 of the reservoir cap 18 is collected by the receptacle 20. The reservoir 14 mechanically engages with the base member 22 such that the reservoir 14 is releasably locked to the base member 22. More specifically, the reservoir 14 mechanically engages with the base member 22 by way of a twist-and-lock configuration. Even more specifically, as illustrated at FIG. 4, the reservoir 14 includes an engagement shoulder 44 and a protuberance 46, which is disposed at the engagement shoulder 44. In one embodiment, the reservoir 14 includes two engagement shoulders 44, each having a corresponding protuberance 46, disposed opposite one another with respect to the reservoir opening 24. Additionally, as illustrated at FIG. 5, the base member 22 includes a corresponding groove 48 adapted to receive each respective engagement shoulder 44. Each groove 48 includes at least one deflectable projection 50. To mechanically engage the reservoir 14 with the base member 22, each engagement shoulder 44 is aligned with its corresponding groove 48 and the reservoir 14 is rotated such that each engagement shoulder 44 is received by its corresponding groove 48. As the reservoir 14 is being rotated, the protuberances 46 deflect the projections 50, indicating the relative rotational position of the reservoir 14 with respect to the base member 22. When a substantial portion of the engagement shoulder 44 is received by the groove 48, the reservoir 14 is mechanically engaged with the base member 22 or, stated differently, is in the locked position. In one embodiment, the reservoir 14 is in the locked position when the engagement shoulder 44 is received by the groove 48 and the reservoir 14 is rotated until a projection 50 prevents the reservoir 14 from being further rotated. When the reservoir 14 is in the locked position, the engagement shoulder 44 fits snugly against the groove 48 such that the reservoir 14 is substantially immovable with respect to the base member 22 in response to forces, other than rotational forces about the longitudinal axis of the reservoir 14, applied against the reservoir 14 or the base member 22.

To disengage the reservoir 14 from the base member 22, the reservoir 14 is rotated such that the engagement shoulder 44 is no longer received by the groove 48. In one embodiment, the reservoir handle 52 can be used to facilitate engaging and disengaging the reservoir 14 and the base member 22. Although the above-discussed embodiment includes a twist-and-lock configuration, the animal watering/feeding device 10 can include any locking configuration that requires the user to disengage the reservoir 14 from the base member 22 prior to removing the reservoir 14 from the base member 22.

Figure 6:
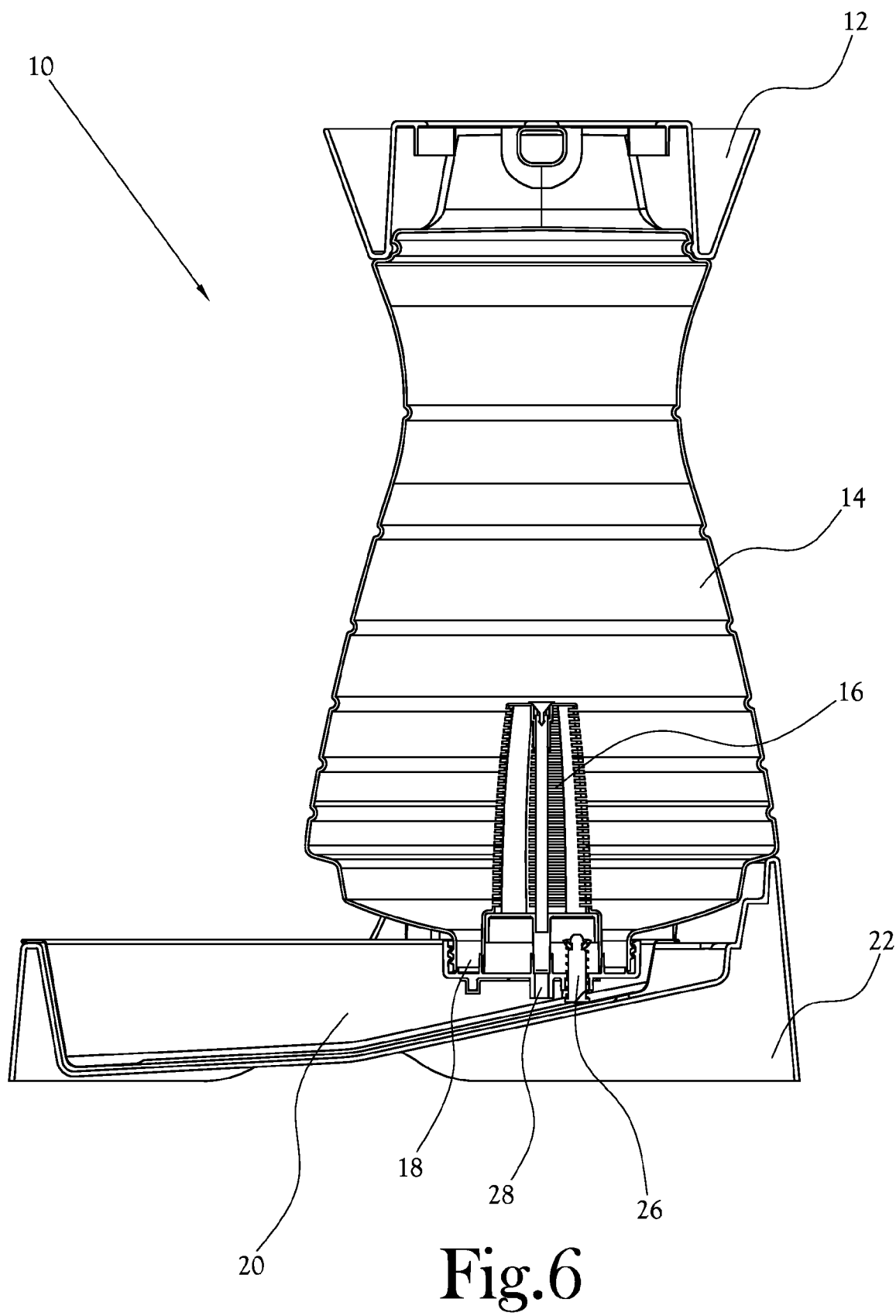
FIG. 6 is a cross sectional view of the animal watering/feeding device taken at lines 6-6 of FIG. 1b.

FIG. 6 is a cross-sectional view of the animal watering/feeding device 10 of FIG. 1b, taken at lines 6-6, whereby the reservoir 14 is mechanically engaged with the base member 22 in accordance with the above discussion. When the reservoir 14 is engaged with the base member 22, the water valve 26 engages the receptacle 20 such that the water valve 26 is moved to the open position. More specifically, in the illustrated embodiment, the valve stem 34 is pushed against the receptacle 20 such that the biasing force generated by the valve spring 36 is overcome and the water-tight seal at the water outlet 32 is repairably broken. The water outlet 32 is positioned above the receptacle 20 such that when the water valve 26 is at the open position, gravity forces water housed by the reservoir 14 to flow through the water outlet 32 and to the receptacle 20, where it is collected and made accessible by the animal.

Because the receptacle 20 is removably received by the base member 22, the receptacle 20 provides for a gravity-induced automatic watering/feeding device that promotes increased sanitation. More specifically, as with conventional gravity-induced watering/feeding devices, the animal watering/feeding device 10 requires that the base member 22 be substantial to the extent that it provides structural support for the remainder of device 10. However, unlike the conventional devices, the animal watering/feeding device 10 includes the receptacle 20, which is removable from the base member 22 such that only the receptacle 20, and not the base member 22, must be regularly sanitized. As a result, the ease of removing the receptacle 20 from the base member 22 and the substantially lesser size of the receptacle 20 with respect to the base member 22 promotes more frequent sanitizing and/or replacement of the receptacle 20. Accordingly, the animal watering/feeding device 10 provides a more sanitary gravity-induced watering/feeding device.

Additionally, considering the above discussion, when the reservoir 14 is bumped, such as by the animal, or is physically lifted, the relative positional relationship between the reservoir 14 and the base member 22 is substantially unchanged. This prevents the reservoir 14 from being inadvertently knocked from the base member 22 and spilling its contents. Additionally, when the animal watering/feeding device 10 is adapted to provide the animal with food and the device 10 is overturned, the reservoir 14 remains engaged with the base member 22, reducing the amount of contents spilled from the reservoir 14. When the animal watering/feeding device 10 is adapted to provide the animal with water, the reservoir 14 can be kept at the unlocked position such that when the device 10 is overturned, the reservoir 14 separates from the base member 22 to the extent that the water valve 26 moves to the closed position, preventing water from spilling from the reservoir 14.

Figure 7:
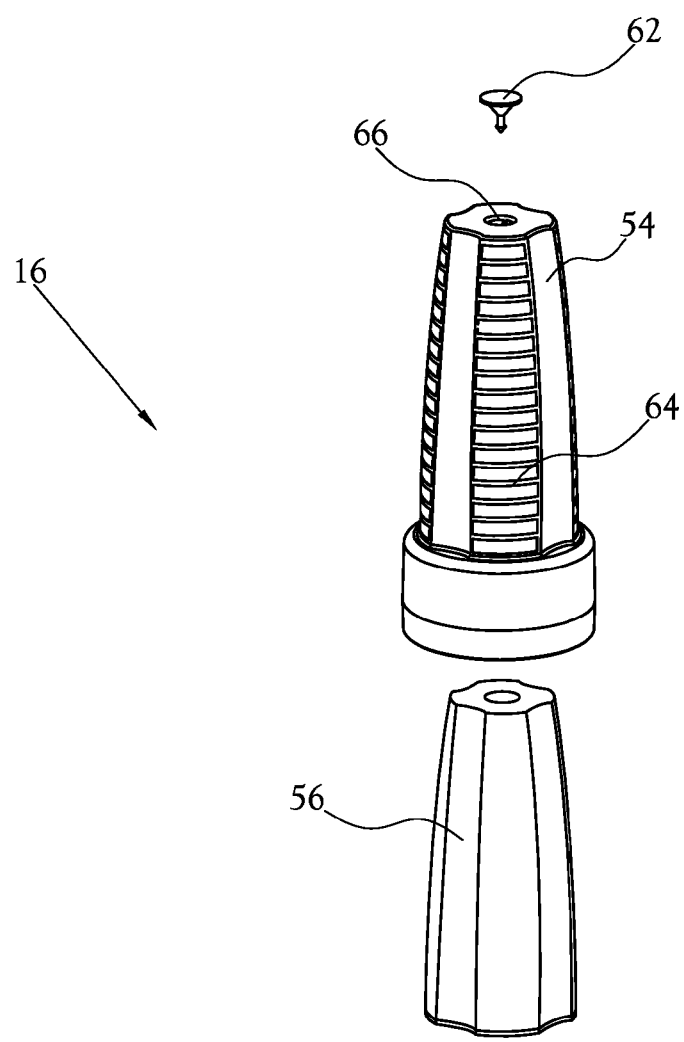
FIG. 7 illustrates the water filter module of the animal watering/feeding device of FIGS. 1a and 1b.
Figure 7:
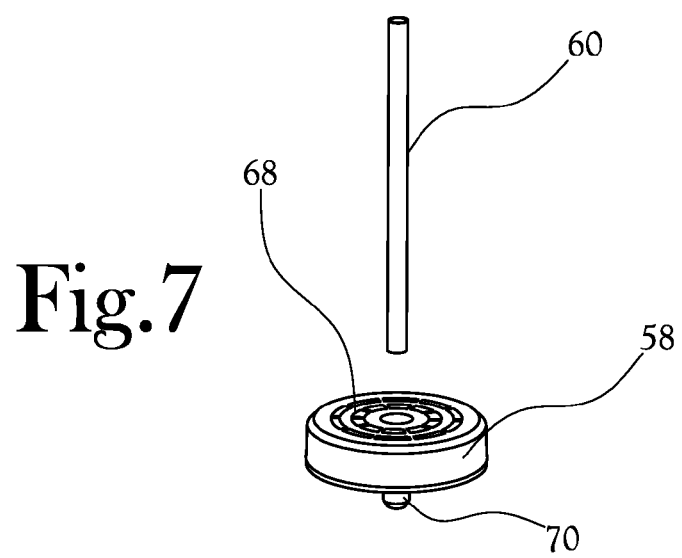

FIG. 7 illustrates one embodiment of the water filter module 16 in accordance with the various features of the present invention. In the illustrated embodiment, the water filter module 16 includes a filter housing 54, a filter media 56, a filter cap 58, a ventilation tube 60, and an air valve 62. The filter housing 54 is adapted to house the filter media 56 and defines a plurality of intake vents 64 through which water enters the water filter module 16. The filter housing 54 cooperates with the filter cap 58 to substantially enclose the filter media 56. The filter cap 58 defines a water egress 68 and an air ingress 70. Water entering the filter housing 54 by way of the intake vents 64 passes through the filter media 56 and exits the water filter module 16 by way of the water egress 68. As a result, water exiting the water egress 68 is filtered water. The air ingress 70 is in water-tight communication with a first end of the ventilation tube 60 such that air entering the air ingress 70 is channeled to the ventilation tube 60. The air valve 62 is a one-way valve in water-tight communication with a second end of the ventilation tube 60, the second end being that opposite the first end. The air valve 62 permits air to exit the ventilation tube 60 but prevents water from entering it. As a result, air entering the ventilation tube 60 from the air ingress 70 ultimately exits the ventilation tube 60 through the air valve 62. The filter housing 54 defines a ventilation tube channel 66 for receiving the ventilation tube 60. In the illustrated embodiment, the ventilation tube channel 66 runs coaxially through the filter housing 54. For purposes of subsequent discussion, the air ingress 70, the ventilation tube 60, and the air valve 62 are collectively referred to as the filter ventilation system. The water filter module 16 can be reusable or disposable. When the water filter module 16 is reusable, the filter cap 58 cooperates with the filter housing 54 such that the filter cap 58 is removably secured to the filter housing 54. When the filter cap 58 is removed from the filter housing 54, a used filter media 56 can be removed from the filter housing 54 and an unused filter media 56 placed therein.

The filter housing 54 is adapted to be removably fastened to the reservoir cap 18 such that the housing 54 and the cap 18 generate a water-tight seal and the water filter module 16 is positioned within the reservoir 14. For example, in the illustrated embodiment, the filter housing 54 and the reservoir cap 18 include respective cooperating threaded portions. When the housing 54 and the cap 18 are fastened, the air inlet 28 of the reservoir cap 18 is in water-tight communication with the air ingress 70 of the filter cap 58 such that air entering the air inlet 28 is channeled to the air ingress 70. Additionally, the water egress 68 of the filter cap 58 is in fluidic communication with the water outlet 32 such that water flowing from the water egress 68 is channeled to the water outlet 32. As a result, the water that passes through the water outlet 32 has passed through the water filter module 16 such that the water collected in the receptacle 20 is filtered water.

As discussed above, when the components of the animal watering/feeding device 10 are mechanically engaged and fastened in accordance with the above discussion, the water valve 26 is at the open position. Consequently, under the force of gravity, the water contained within the reservoir 14 passes first through the water filter module 16, then through the water valve 26, and is ultimately collected in the receptacle 20. For water to flow from the reservoir 14, air must be released into the reservoir 14 to displace the water. Accordingly, the structure of the receptacle 20 and its positional relationship with the air inlet 28 is such that the mouth of the air inlet 28 is positioned below the maximum water level capacity of the receptacle 20. As a result, when the water level in the receptacle 20 is below the mouth of the air inlet 28, the air inlet 28 draws ambient air into the filter ventilation system, which releases the air into the reservoir 14, displacing the water flowing from the reservoir 14. Conversely, when the water level rises above the mouth of the air inlet 28, the air inlet 28 cannot draw ambient air and the water ceases to flow from the reservoir 14. As a result, the animal watering/feeding device 10 automatically fills the receptacle 20 with water but not to the extent that the receptacle 20 overflows. Additionally, when the animal consumes water from the receptacle 20 to the extent that the water level drops below the mouth of the air inlet 28, the animal watering/feeding device 10 replenishes the receptacle 20.

Figure 3B:
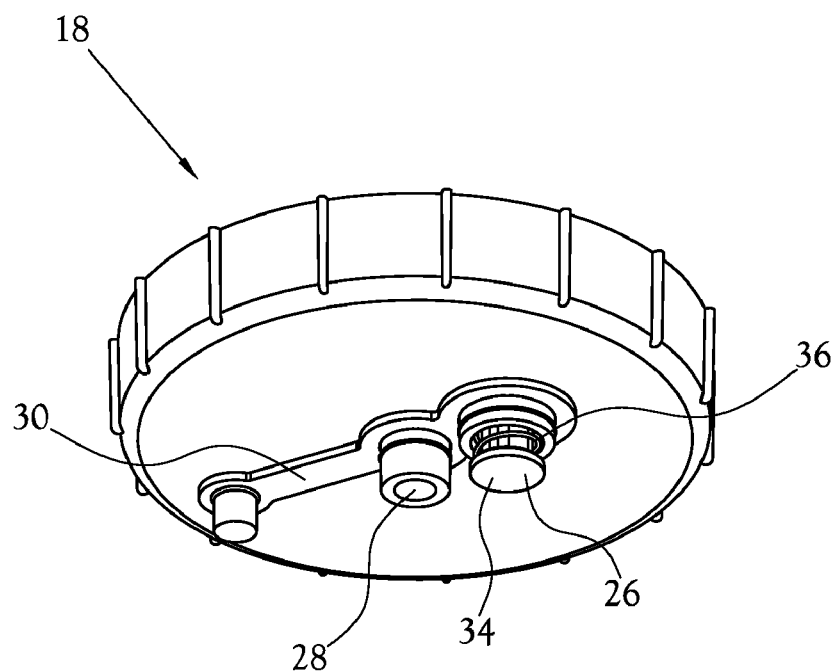
FIG. 3b illustrates yet another alternate view of the reservoir cap of FIG. 2.

Although the embodiment of the animal watering/feeding device 10 illustrated at FIGS. 1 and 6 includes a water filter module 16, it should be noted that the animal watering/feeding device 10 does not require the water filter module 16 to remain within the scope or spirit of the present invention. It should also be noted that when the animal watering/feeding device 10 does not include the water filter module 16, the ventilation system, namely the air ingress 70, the ventilation tube 60, and the air valve 62, can be utilized independently or not at all. When the ventilation system is not employed, the plug 30 of the reservoir cap 18, illustrated at FIGS. 2 and 3*b*, is inserted into the air inlet 28, generating a water-tight seal and preventing water from leaking from the reservoir 14. It should also be noted that when the animal watering/feeding device 10 includes the water filter module 16, the ventilation system need not be integral to the water filter module 16 to remain within the scope or spirit of the present invention. However, because of the surface tension of the water across the small pore size of the filter media 56, when the animal watering/feeding device 10 includes the water filter module 16, the filter ventilation system must be utilized.

In one embodiment, the reservoir 14 is initially filled or refilled by disengaging the reservoir 14 from the base member 22, removing the reservoir cap 18 from the reservoir 14, inverting the reservoir 14 such that the reservoir opening 24 is upwards, and filling the reservoir 14 by way of the reservoir opening 24. When the reservoir is satisfactorily filled, the reservoir cap 18 is fastened to the reservoir 14 in accordance with the above discussion. Because the water valve 26 is at the closed position when the reservoir 14 is not engaged with the base member 22, the filled reservoir 14 can be carried using the reservoir handle 52, and the water will not pour from the reservoir 14.

Figure 8:
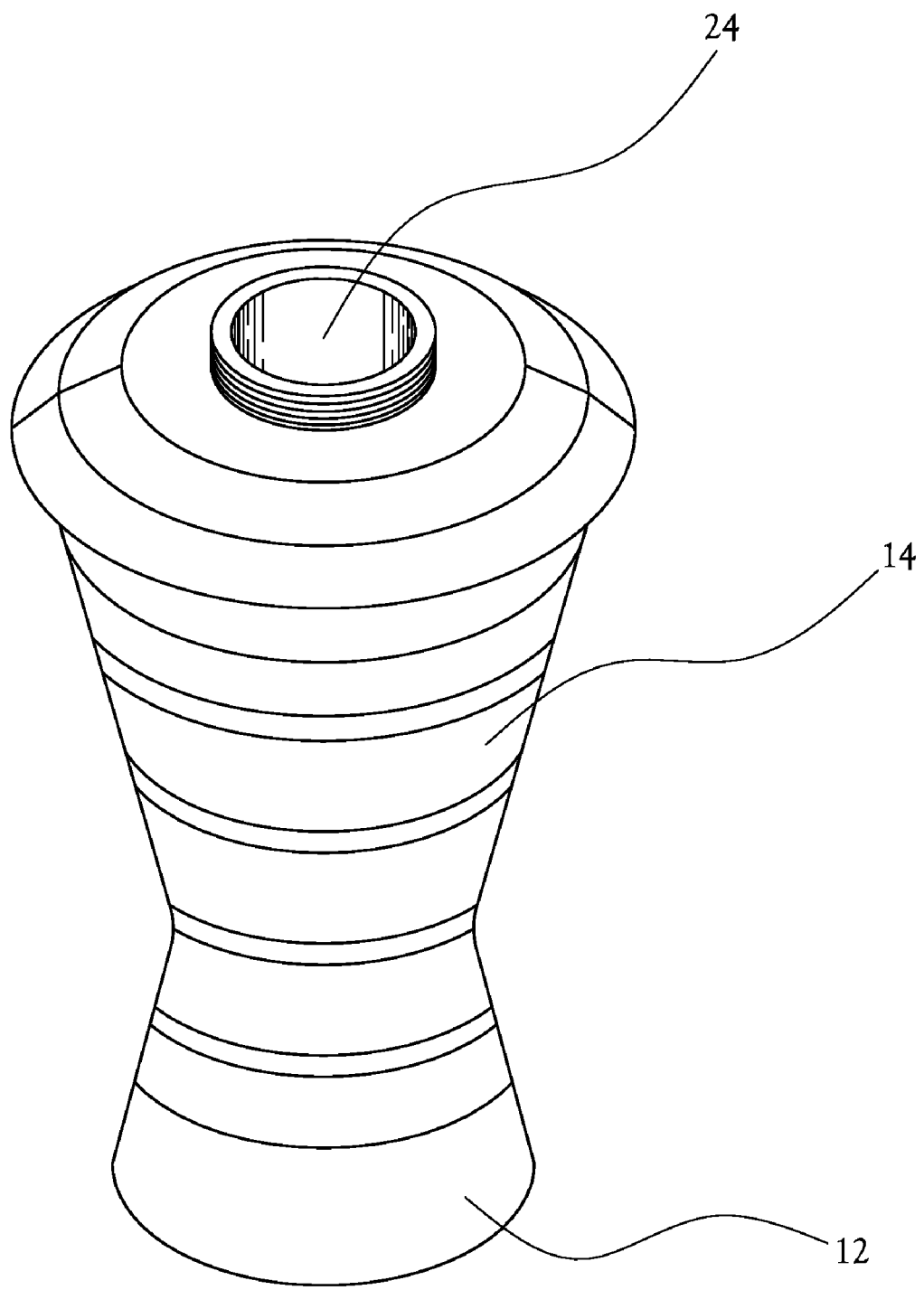
FIG. 8 illustrates an alternate view of the reservoir of FIG. 4.

The reservoir support member 12 is secured to the reservoir 14 at the reservoir handle 52. The reservoir support member 12 provides the reservoir 14 with structural support and stability when the reservoir 14 is inverted. For example, when the reservoir 14 is being filled with water, the reservoir 14 is positioned such that the reservoir support member 12 structurally supports the reservoir 14, as illustrated at FIG. 8. Additionally, in the illustrated embodiment, the reservoir support member 12 defines a handle to cooperate with the reservoir handle 52 such that the user can utilize the reservoir handle 52 when the reservoir support member 12 is secured to the reservoir 14. It should be noted that the reservoir support member 12 can be an integral part of the reservoir 14 without departing from the scope or spirit of the present invention.

Figure 9A:
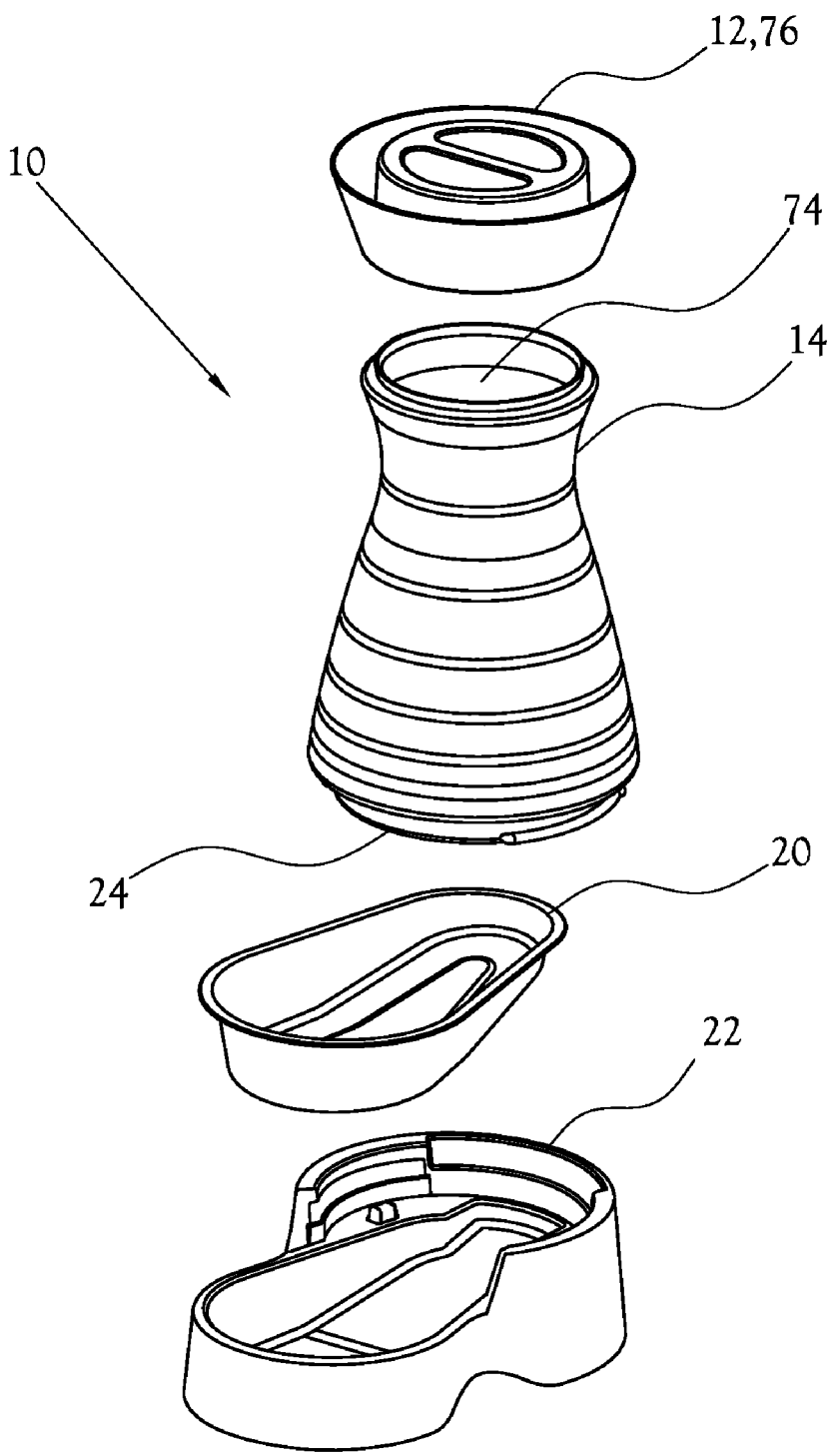
FIG. 9a illustrates an exploded view of an alternate embodiment of the animal watering/feeding device adapted to store and distribute animal food.
Figure 9B:
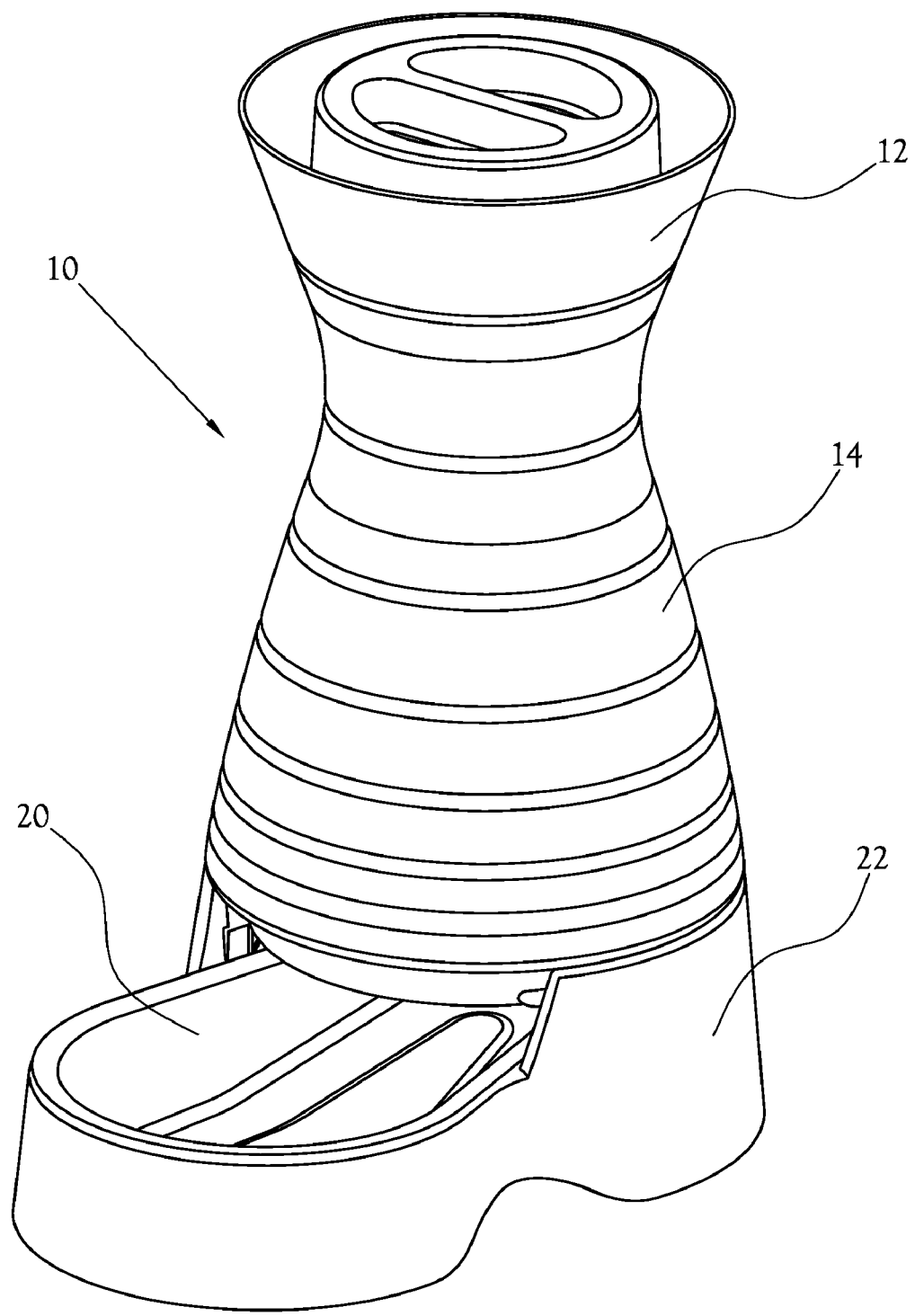

FIGS. 9*a* and 9*b* illustrate one embodiment of the animal watering/feeding device 10 adapted to provide the animal with animal food. In the illustrated embodiment, the animal watering/feeding device 10 includes the reservoir support member 12, the reservoir 14, the receptacle 20, and the base member 22. It is understood that the water filter module 16 and the reservoir cap 18 are not used when the animal watering/feeding device 10 is adapted to provide the animal with food. Additionally, because the reservoir 14 of the illustrated embodiment of FIGS. 9*a* and 9*b* is adapted to house animal food, the reservoir opening 24 is substantially larger than that of the previously discussed embodiment, which provided the animal with water. The larger reservoir opening 24 promotes a freer flow of animal food from the reservoir 14. In accordance with the above discussion, gravity forces the animal food contained within the reservoir 14 to pass through the reservoir opening 24 and to be collected in the receptacle 20. When the food level in the receptacle 20 is below the mouth of the reservoir opening 24, food passes through the reservoir opening 24 and to the receptacle 20. Conversely, when the food level rises to a point that prevents more food from exiting the reservoir opening 24, the food ceases to flow from the reservoir 14. As a result, the animal watering/feeding device 10 automatically fills the receptacle 20 with animal food but not to the extent that the receptacle 20 overflows. Additionally, when the animal consumes the animal food from the receptacle 20 to the extent that the food level drops below the reservoir opening 24, the animal watering/feeding device 10 replenishes the receptacle 20.

In the embodiment of the animal watering/feeding device 10 illustrated at FIG. 9*a*, the reservoir 14 defines a second reservoir opening 74 and includes a lid 76 that is removably secured to the reservoir 14 at the second reservoir opening 74. For example, in the illustrated embodiment, the lid 76 and the reservoir 14 define respective cooperating threaded portions such that the lid 76 can be removably secured to the reservoir 14. Also, in the illustrated embodiment, the lid 76 serves as the reservoir support member 12. In this embodiment, the user can remove the lid 76 and fill the reservoir 14 with animal food by way of the second reservoir opening 74 such that the reservoir 14 can be filled without disengaging the reservoir 14 from the base member 22.

From the foregoing description, those skilled in the art will recognize that a gravity-induced automatic animal watering/feeding device offering advantages over the prior art has been provided. More specifically, the animal watering/feeding device presents consumables, including water and animal food, to the animal using a receptacle that is removable from the remainder of the device. Because the receptacle is removable, it is easily replaced and/or removed for cleaning such that sanitation of the animal watering/feeding device is easily maintained. Additionally, selected components of the animal water/feeding device are releasably locked to one another such that the device minimizes the amount of water/food that is spilled from the device in the event it is overturned.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A gravity-induced automatic animal watering/feeding device, said animal watering/feeding device comprising:
   a reservoir to house a consumable, the reservoir defining a reservoir opening to pass the consumable from said reservoir by way of the reservoir opening, said reservoir including an engagement shoulder and a protuberance;
   a base member to support the reservoir, said base member including a groove and at least one deflectable projection;
   a receptacle removably received by the base member to receive the consumable when it passes from the reservoir; and
   a reservoir cap removably secured to the reservoir opening and including a water outlet, an air inlet, and a valve disposed at the water outlet, the air inlet being substantially centrally located in the reservoir cap, the valve having a first position to allow the consumable to flow from the reservoir to the receptacle by way of the water outlet when the reservoir is supported by the base member, and a second position to prevent the consumable from flowing from the reservoir when the reservoir is removed from the base member; a water filter housing to house a filter media, the water filter housing defining at least one intake vent to allow the consumable to enter the water filter housing, a water egress, an air egress, and an air ingress, said water filter housing releasably mounted to said reservoir cap to allow the water egress to be in fluidic communication with the water outlet, and to allow the air ingress to be in gaseous communication with air inlet; and
   a ventilation tube to extend through the filter media, the ventilation tube having a first end in gaseous communication with the air ingress, and a second end opposite the first end in gaseous communication with the air egress,
   wherein ambient air enters said reservoir by way of the air inlet, the air ingress, and the ventilation tube, and ambient air exits the ventilation tube by way of the air egress, and
   wherein said reservoir is engaged with said base member by way of a twist-and-lock configuration such that as the reservoir is rotated with respect to the base member, the groove receives the engagement shoulder and the protuberance deflects the at least one projection to indicate the relative rotational position of the reservoir with respect to the base member.

2. The animal watering/feeding device of claim 1 wherein said receptacle is disposable.

3. The animal watering/feeding device of claim 1 wherein said receptacle is constructed of stainless steel.

4. The animal watering/feeding device of claim 1 wherein said receptacle is constructed of a plastic.

5. The animal watering/feeding device of claim 1 wherein the consumable is an animal food.

6. The animal watering/feeding device of claim 1 wherein the consumable is a liquid.

7. The animal watering/feeding device of claim 6, further comprising an air valve connected to the air egress, wherein the ambient air and the air valve permits the ambient air to exit the ventilation tube and prevents the consumable from entering the ventilation tube from said reservoir.

8. The animal watering/feeding device of claim 7, wherein the reservoir cap further comprises a plug removably connected to the air inlet to generate a liquid-tight seal at the air inlet.

9. The animal watering/feeding device of claim 1, wherein the valve is biased to the second position and is movable between the first position and the second position, and the valve is forced to the first position by the receptacle when the reservoir is supported by the base member.

10. The animal watering/feeding device of claim 1 wherein said reservoir is releasably locked to said base member when engaged with said base member.

11. The animal watering/feeding device of claim 1, wherein the ventilation tube extends from the air inlet to a location above the filter media.

12. A gravity-induced automatic animal watering/feeding device, said animal watering/feeding device comprising:
   a reservoir defining a reservoir opening, said reservoir being adapted to house a consumable, the consumable being such that it is able to pass from said reservoir by way of the reservoir opening, said reservoir including an engagement shoulder and a protuberance;
   a base member adapted to engage with said reservoir, said base member structurally supports and positions said reservoir such that the consumable passes from said reservoir when said base member is engaged with said reservoir, said base member including a groove and at least one deflectable projection;
   a reservoir cap adapted to be secured to said reservoir at the reservoir opening such that said reservoir cap and said reservoir generate a water-tight seal at the reservoir opening, said reservoir cap defining a water outlet and an air inlet, the air inlet being substantially centrally located in the reservoir cap, said reservoir cap including a water valve disposed at the water outlet and an air valve disposed at the air inlet, the consumable flows from the reservoir by way of the water outlet, ambient air enters said reservoir by way of the air inlet such that the ambient air displaces the consumable that flows from the reservoir, the air valve permits the ambient air to enter said reservoir by way of the air inlet and prevents the consumable from flowing from said reservoir by way of the air inlet, the water valve being movable between a closed position and an open position and being biased to the closed position, the water valve preventing the consumable from flowing from said reservoir by way of the water outlet when at the closed position, the water valve permitting the consumable to flow from said reservoir by way of the water outlet when at the open position, the water valve being forced to the open position when said base member engages said reservoir;
   a water filter housing to house a filter media, the water filter housing disposed within said reservoir and releasably mounted to an interior surface of the reservoir cap, said water filter housing defining at least one intake vent to allow the consumable to enter the water filter housing, a water egress, an air egress, and an air ingress, water filter housing cooperating with said reservoir cap to allow the water egress to be is in fluidic communication with the water outlet and to allow the air ingress to be is in gaseous communication with the air inlet; is in gaseous communication with the air ingress such that the ambient air enters said reservoir by way of the air inlet, the air ingress, a ventilation tube to extend through the filter media, the ventilation tube having a first end in gaseous communication with the air ingress, and a second end opposite the first end in gaseous communication with the air egress; the ventilation tube; and a receptacle adapted to be removably received by said base member, when said receptacle is received by said base member, said receptacle is positioned with respect to the reservoir opening such that said receptacle receives the consumable when it passes from the reservoir, wherein ambient air enters said reservoir by way of the air inlet, the air ingress, and the ventilation tube, and ambient air exits the ventilation tube by way of the air egress, and the ventilation tube extends from the air inlet to a location above the filter media, and wherein said reservoir is engaged with said base member by way of a twist-and-lock configuration such that as the reservoir is rotated with respect to the base member, the groove receives the engagement shoulder and the protuberance deflects the at least one projection to indicate the relative rotational position of the reservoir with respect to the base member.

13. The animal watering/feeding device of claim 12 wherein said reservoir engages said base member such that said reservoir is releasably locked to said base member.

* * * * *